US009118045B2

(12) United States Patent
Marshall et al.

(10) Patent No.: US 9,118,045 B2
(45) Date of Patent: Aug. 25, 2015

(54) HIGH TEMPERATURE LITHIUM BATTERY, HAVING INITIAL LOW TEMPERATURE USE CAPABILITY

(75) Inventors: Richard J. Marshall, Carstairs (CA); Robert Yetman, West Roxbury, MA (US)

(73) Assignee: ENGINEERED POWER LTD., Calgary, Alberta (CA)

( * ) Notice: Subject to any disclaimer, the term of this patent is extended or adjusted under 35 U.S.C. 154(b) by 595 days.

(21) Appl. No.: 13/277,902

(22) Filed: Oct. 20, 2011

(65) Prior Publication Data
US 2013/0101880 A1   Apr. 25, 2013

(51) Int. Cl.
| | |
|---|---|
| *H01M 4/04* | (2006.01) |
| *H01M 10/0563* | (2010.01) |
| *H01M 4/36* | (2006.01) |
| *H01M 4/40* | (2006.01) |
| *H01M 10/052* | (2010.01) |
| *H01M 4/46* | (2006.01) |

(52) U.S. Cl.
CPC ............ *H01M 4/0404* (2013.01); *H01M 4/043* (2013.01); *H01M 4/366* (2013.01); *H01M 4/405* (2013.01); *H01M 4/466* (2013.01); *H01M 10/052* (2013.01); *H01M 10/0563* (2013.01); *Y02E 60/122* (2013.01); *Y10T 29/49108* (2015.01)

(58) Field of Classification Search
CPC ... H01M 4/0404; H01M 4/043; H01M 4/366; H01M 4/405; H01M 4/466; H01M 10/052; H01M 10/0563; Y02E 60/122; B05D 5/12
USPC ......... 429/233, 234, 245, 209, 231.95, 231.6, 429/199; 427/77
See application file for complete search history.

(56) References Cited

U.S. PATENT DOCUMENTS

2009/0269609 A1* 10/2009 Hirayama ................... 428/606

FOREIGN PATENT DOCUMENTS

JP            05182693         7/1993

OTHER PUBLICATIONS

George E. Blomgren, "Analytical problem solving in lithium battery technology", Union Carbide Corporation, Battery Products Division, Pure & Appl. Chem., vol. 57, No. 2, pp. 383-388, 1985.
John H. Cohen et al, "Development of a Mud-Pulse High-Temperature Measurement-While-Drilling (MWD) System", Final Report Sep. 31, 1999-Jan. 31, 2002, Maurer Technology Inc. Sperry Sun, DE-AC26-97FT34345, Jan. 2002, TR02-16, 77 pages.
Don Hensley et al, "The Evolution of Oilfield Batteries", Oilfield Review, pp. 42-57, Autumn 1998.
Canada Office Action, U.S. Pat. No. 2,755,597 dated Oct. 1, 2013.

* cited by examiner

*Primary Examiner* — Raymond Alejandro

(57) ABSTRACT

A battery adapted to operate at low (typically ambient) temperatures for a short initial period and thereafter at higher temperatures. A Li—Mg alloy anode is provided, including up to 25% magnesium, in a liquid thionyl chloride bath which acts as the cathode. A thin, substantially pure lithium layer is applied to a surface of the Li—Mg anode, preferably of a thickness in the range of 0.0019 to 0.0025 inch to allow obtaining of sufficiently high power and voltage output at lower temperatures for a short period where at such lower temperatures the required voltage and power would not otherwise be available from a Li—Mg anode. Thereafter, the battery may be used in, and exposed to, higher temperatures where at such temperatures the necessary voltage and power from the remaining Li—Mg alloy anode is then available.

12 Claims, 16 Drawing Sheets

HIGH TEMPERATURE LITHIUM BATTERY, HAVING INITIAL LOW TEMPERATURE USE CAPABILITY

FIELD OF THE INVENTION

The present invention relates to batteries.

BACKGROUND OF THE INVENTION

High energy density batteries are typically needed and used in oil drilling operations, namely to power various downhole electrical equipment, and are frequently of the lithium metal anode type, which provide the needed high energy density in comparison to conventional primary batteries (ie non-rechargeable type batteries).

Typically, in oil drilling operations such batteries are located downhole, proximate a drill bit, to provide electrical power to downhole equipment, including sensors and measurement-while-drilling ("MWD") mud pulsers, which send mud pulses encoded with information from such sensors uphole to surface so as to assist drilling operators in steering the drilling equipment into oil bearing formations, and further giving data as to the types and densities of rock formations encountered during the drilling of such oil wells.

As well depth increases, temperatures may increase from an ambient surface temperature (of say, 23° C.) to temperatures exceeding 100° C., and frequently temperatures in the range of 125° C. to 200° C. are typically encountered at several thousand meters of well depth.

Lithium batteries typically employ lithium metal or a lithium alloy as the anode. Substantially pure lithium may be used as the anode, and in certain types of lithium batteries liquid thionyl chloride [$SOCl_2$] may be used as the cathode, to produce a flow of electrons. The electrochemical oxidation-reduction reaction which occurs to produce such flow of electrons may be as follows:

at the anode: $Li \rightarrow Li^+ + e^-$ 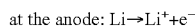

at the cathode : $4Li^+ + 4e^- + 2SOCl_2 \rightarrow 4LiCl + SO_2 + S$ 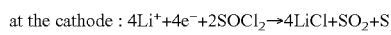

overall reaction: $4Li + 2SOCl_2 \rightarrow 4LiCl + SO_2 + S$ 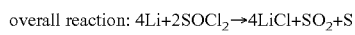

Unfortunately, pure lithium metal has a melting temperature of 180.5° C., and standard lithium batteries are accordingly limited to temperatures of about 160° C. to thereby avoid melting of the lithium anode within the battery and consequent explosion of the battery, or at a minimum failure of the operation of the battery. Accordingly, lithium batteries which employ substantially 100% lithium as the anode will typically fail at high temperatures of the magnitude encountered when drilling several thousand meters beneath the surface, where temperatures are often, as mentioned above, in the 200° C. range.

It is known to alloy lithium metal in a lithium battery with 10% magnesium in order to raise the melting point of the resulting 90% Li-10% Mg alloy, thereby raising the maximum temperature to which such a lithium battery may be exposed to up to 200° C., thus rendering lithium-mg alloy batteries usable in downhole applications where temperatures may regularly approach such temperature. (Battery manufactures typically stipulate such batteries are temperature- limited to 180° C., to thereby provide a small "safety buffer".)

It is further known to alloy lithium metal in a lithium battery with 25% magnesium in order to raise the melting point of the resulting Li—Mg alloy anode up to 220° C., thereby raising the maximum temperature to which such a lithium battery may be exposed, thus rendering lithium-mg alloy batteries usable in downhole applications where temperatures may regularly approach such temperature. (Battery manufactures typically presently stipulate such batteries are temperature limited to 200° C. to thereby similarly stipulate a small "safety buffer" of approximately 20° C.).

Notably, however, while alloying the lithium in the lithium anode with magnesium of up to 25% allows operation of such battery up to the relative high temperature of 200° C., unfortunately such step has the negative side effect of significantly reducing the power and voltage available from such battery at lower temperatures, namely temperatures less than about 50-100°, particularly where a battery may have been sitting idle at such room temperature for periods of approximately forty (40) days or more. This negative side effect produces a significant obstacle to downhole tool companies desiring to test electronic equipment (which is to be powered by such batteries at surface under ambient temperatures, typically at temperatures less than 50° C. and typically at ambient room temperature of approximately 23° C.) to ensure such equipment is properly operating at surface before inserting such equipment downhole for use in drilling operations. This is due to the fact that the power and voltage available from such a lithium metal alloy anode battery at ambient temperatures, for example 23° C., is relatively low, and not sufficient to allow adequate and proper testing of the electrical equipment in the tools powered by such battery at well surface due to insufficient power/voltage supplied by such battery at such ambient temperatures.

To overcome the above negative side effect, downhole tool companies presently apply a heater blanket to tools containing a lithium battery (or battery pack) at surface, in order to significantly raise the temperature of the battery(ies) within the tool at surface to a range of about 50-70° C., in order to thereby obtain sufficient power and voltage from such lithium battery(ies) at such higher temperatures to allow equipment to be tested at surface to ensure proper operation before being inserted downhole.

Unfortunately, malfunction of the heater and/or overheating of the lithium battery(ies) will result (and has resulted) in explosion of such lithium battery(ies) on a number of occasions. This is a serious and substantial safety concern at a drill site, where risk to worker safety and risk of damage or loss of expensive sensor equipment, are serious and over-riding concerns. Unfortunately, overheating of such lithium-mg alloy batteries has resulted in at least one worker fatality due to the resulting explosion of the lithium battery during heating.

Accordingly, a real and substantial need exists in the downhole tool industry for a battery which can provide sufficient power and voltages [typically 3.6 to 3.9 volts (open circuit) from a single cell ] to various electrical equipment at relatively low ambient temperatures such as in the range of 23° C. for a brief initial period to allow testing of such equipment at surface, but which battery may be subsequently exposed to higher temperatures in the range of up to 200° C. and will continue to reliably operate when such battery and associated downhole tool is located downhole.

SUMMARY OF THE INVENTION

Accordingly, in order to overcome the necessity to heat a battery of the prior art (and thereby running the risk of explosion due to improper heating) when testing electronic equipment powered by such battery at surface, in one broad aspect the present invention relates to a modification of the anode of a high-temperature battery, typically a lithium battery, to thereby allow such battery to provide, for a limited initial time period, the requisite power and voltage output at temperatures lower than what the high-temperature battery is designed to operate, yet such battery thereafter be capable of being exposed to high temperatures downhole without exploding or failing, yet maintaining sufficient voltage and power output.

Accordingly, in a first broad aspect of the present invention, the present invention comprises a battery for operating initially at lower temperatures for a finite period, which battery is further adapted to later operate at higher temperatures, comprising:

(i) an anode comprising a first metal which is a strong reducing agent, and at least one further substance adapted to increase a melting point of said first metal, and (ii) said anode having applied to a surface thereof a thin, substantially uniform layer of said first metal in substantially pure form.

Advantageously, through the electrochemical reaction during discharge of the battery at surface at ambient temperatures, the thin layer of the first metal is typically exhausted in the resulting electrochemical reaction and none is thereby left to melt to cause potential explosion. Moreover and in any event, the amount of first metal in the thin layer of the battery of the present invention, which typically in a preferred embodiment is of a nominal thickness of approximately 0.002 inches (0.0508 mm), is of a sufficiently small amount that even if it did melt such quantity would not substantially raise the risk of explosion.

In a preferred embodiment, the first metal is lithium, and the anode is a lithium alloy anode, and in a further embodiment the anode comprises a lithium-magnesium alloy comprised of at least 10% magnesium, and preferably greater than 10% but no more than 25% (wt) magnesium with a remainder substantially comprised of lithium, which base anode with a magnesium content of 25% and a thin coating of approximately 0.002 inches of pure lithium allows for operating initially at temperatures less than 160° C. and later operating at higher temperatures of up to 200° C. The cathode is in a preferred embodiment thionyl chloride, but may be any other suitable cathodic material, including sulfuryl chloride, which will provide sufficient emf voltage 'V' in the redox reaction to power the desired electrical equipment, provided such cathode and anode are of sufficient surface area to provide sufficient current i (and thus electrical power, where power P=i×V) to power the electrical equipment.

In a further preferred embodiment, the thin layer of substantially pure lithium is of a thickness in the range of 0.0019 to 0.0025 inches (0.04826-0.0635 mm), which thickness can thereby provide an initial short time period, of at least 10 minutes and typically at least 15 minutes under discharge rates typical of the equipment designed to be operated by which relatively high voltages and power can be drawn from the lithium battery, yet the risk when such battery is subsequently exposed to higher temperatures is minimal even if significant quantities of pure lithium in such thin layer remained on the surface of the anode.

In another embodiment of the present invention, the invention relates to a method of making a high temperature battery for initially operating at temperatures in the range less than the melting point of a first metal which acts as a strong reducing agent within said battery, which battery is further adapted to later operate at subsequent higher temperatures exceeding the melting point of said first metal, comprising the steps of:

preparing a metallic alloy anode, substantially comprised of a first metal which acts as a strong reducing agent and containing a further substance to raise the melting point of said alloy anode above the melting point of said first metal in substantially pure form; and applying, to an exterior surface of said anode, a thin substantially uniform layer of said first metal, in substantially pure form.

In a further refinement, said step of preparing a metallic alloy anode comprises the step of forming a substantially flat member having mutually opposite flat sides; and said step of applying, to an exterior portion of said anode, a thin substantially uniform layer of said first metal in substantially pure form comprises the step of applying, under pressure, a thin sheet of said first metal in substantially pure form to at least a portion of one of said mutually opposite flat sides.

In one refinement of the above method, the step of applying said layer of first metal in substantially pure form, under pressure, comprises the step of placing a strip of said metallic alloy anode over a thin sheet of substantially pure first metal, and inserting the strip and sheet through a pair of pressure rollers.

In a preferred method of the above invention, the first metal is lithium, and in yet a further refinement, said step of formulating said metallic alloy anode comprises the step of forming a lithium magnesium alloy comprising approximately 25% magnesium and 75% lithium.

BRIEF DESCRIPTION OF THE DRAWINGS

In the accompanying drawings, which illustrate one or more exemplary embodiments and are not to be construed as limiting the invention to these depicted embodiments:

FIG. 3b is a perspective partially-exploded sectional view of the spiral wind ("jelly roll") type battery shown in FIG. 3a of the present invention, taken along plane C-C of FIG. 3a;

DETAILED DESCRIPTION OF SOME PREFERRED EMBODIMENTS

Figure 1A:
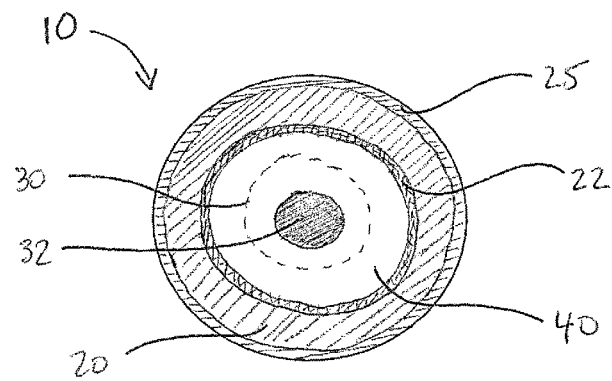
FIG. 1a is a schematic top sectional view through a bobbin-type battery made in accordance with the present invention, taken along plane A-A of FIG. 1b.

In regard to the drawings, like components of the battery of the present invention are identified with identical reference numerals.

Figure 1B:
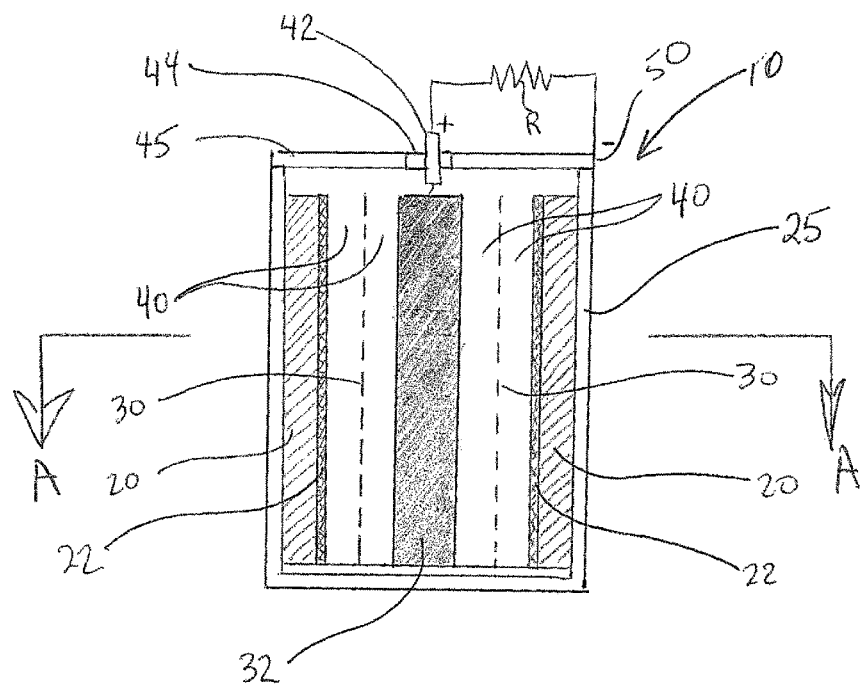
FIG. 1b is a schematic side sectional view of the bobbin-type battery of the present invention shown in FIG. 1b.
Figure 2A:
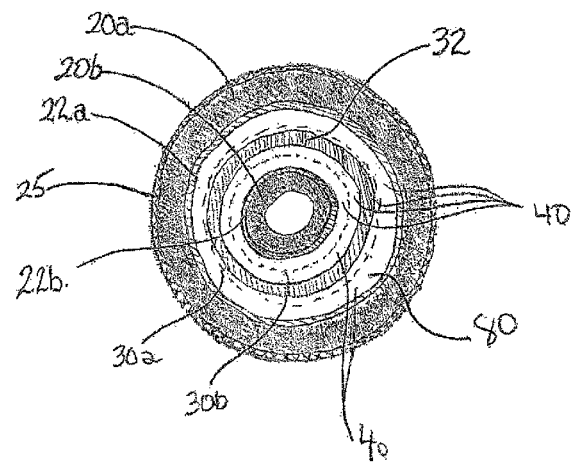
FIG. 2a is a schematic sectional view through a dual-anode type battery made in accordance with the present invention, taken along plane B-B of FIG. 2b.
Figure 2B:
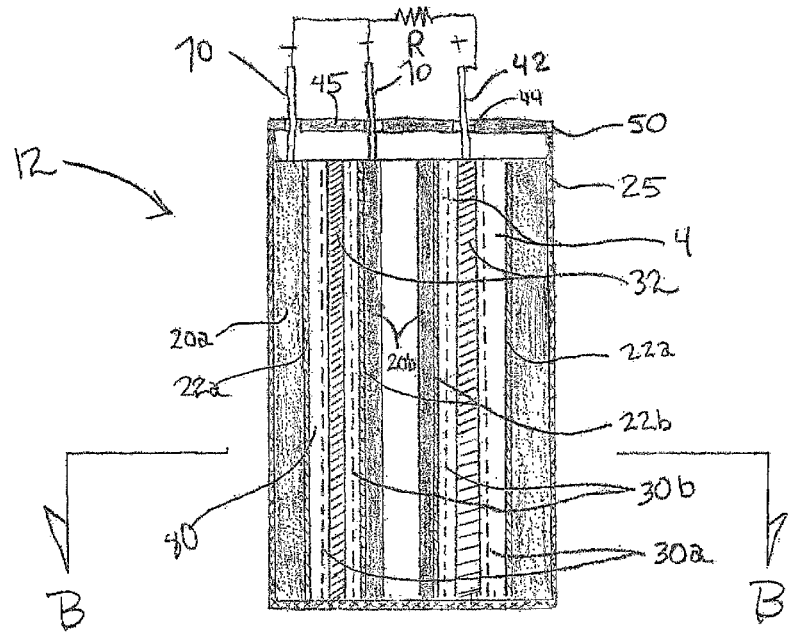
FIG. 2b is a schematic side sectional view of the dual-anode type battery shown in FIG. 2a of the present invention.
Figure 3A:
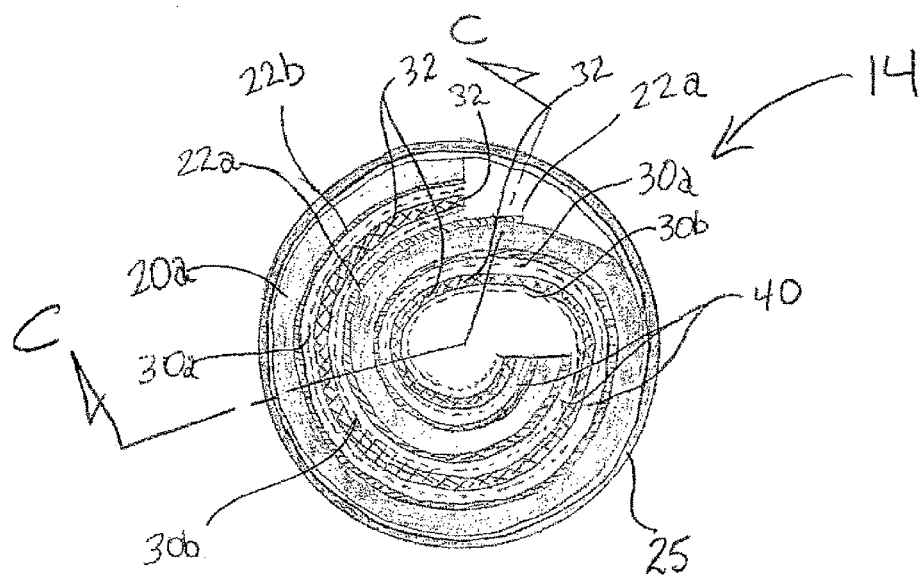
FIG. 3a is a schematic view of a spiral-wind ("jelly roll") type battery made in accordance with the present invention.
Figure 3B:
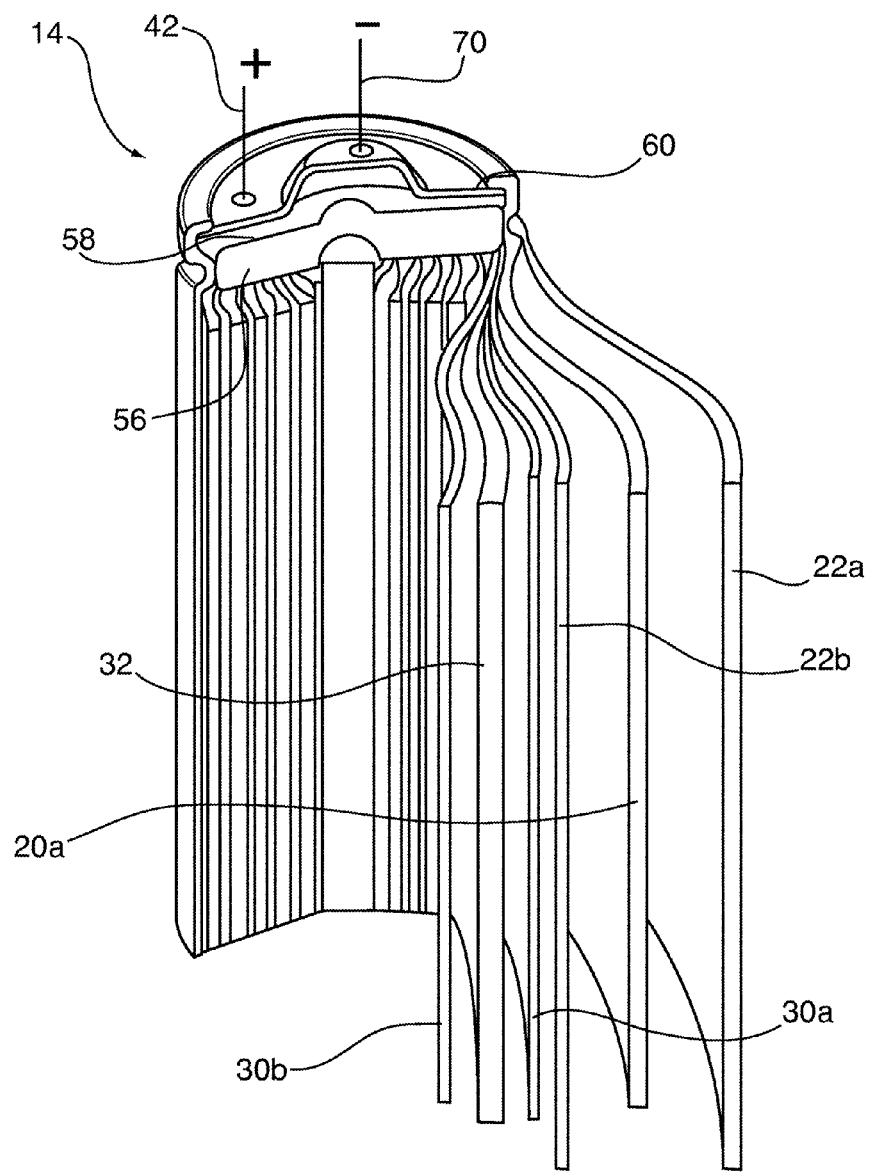
Figure 4:
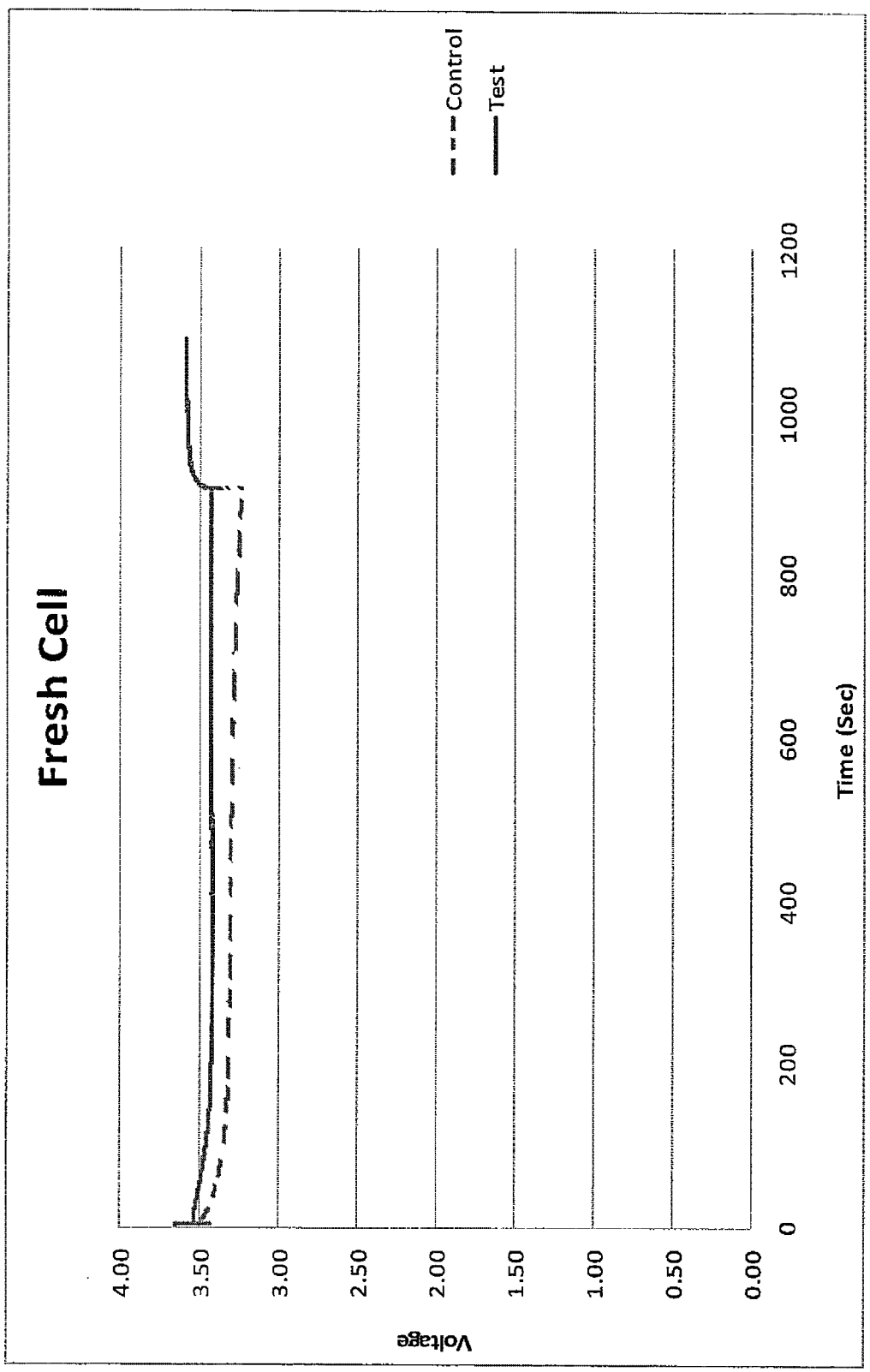
FIG. 4 is a graph of voltage versus time with respect to a control lithium battery and a test lithium battery, each of "DD size", wherein said test lithium battery is made in accordance with the present method, immediately after manufacture of both the control and test batteries, with an initial 250 mA start-up current being drawn from the batteries, at 20° C.
Figure 5:
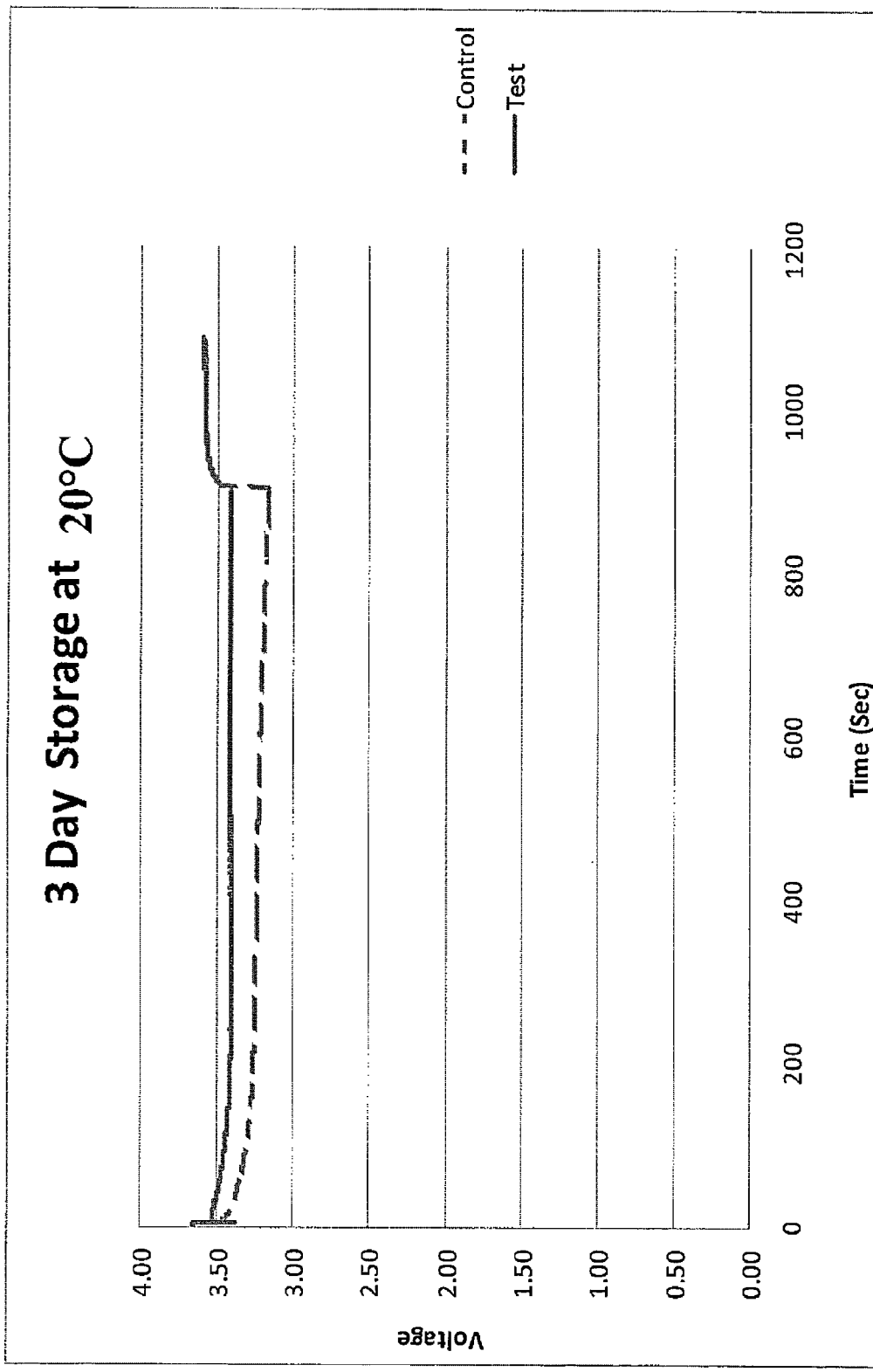
FIG. 5 is a graph of voltage versus time with respect to a control lithium battery and a test lithium battery, each of "DD size", wherein said test lithium battery is made in accordance with the present method, said graph obtained after 3 days storage of said batteries at 20° C.
Figure 6:
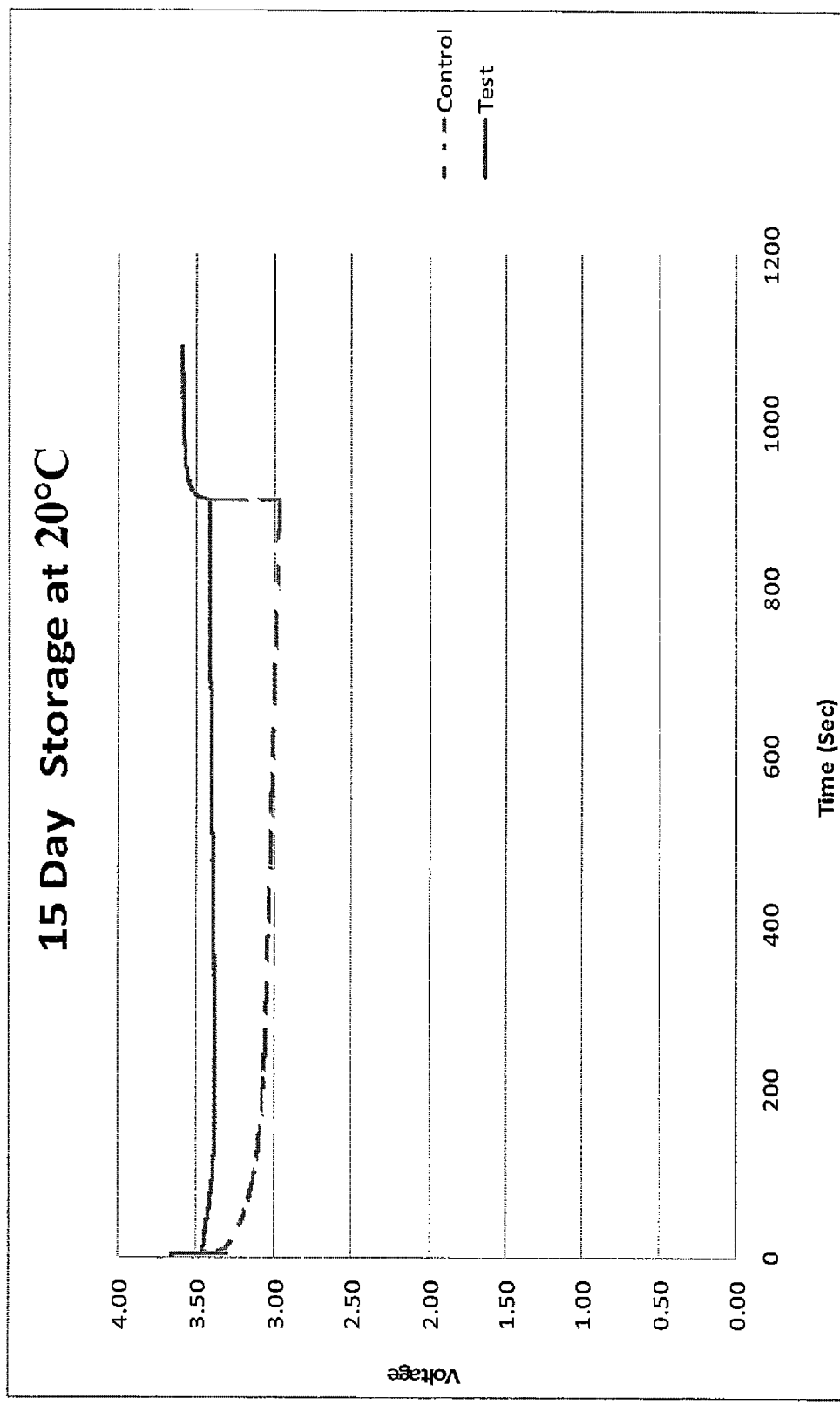
FIG. 6 is a graph of voltage versus time with respect to a control lithium battery and a test lithium battery, each of "DD size" wherein said test lithium battery is made in accordance with the present method, said graph obtained after 15 days storage of said batteries at 20° C.
Figure 7:
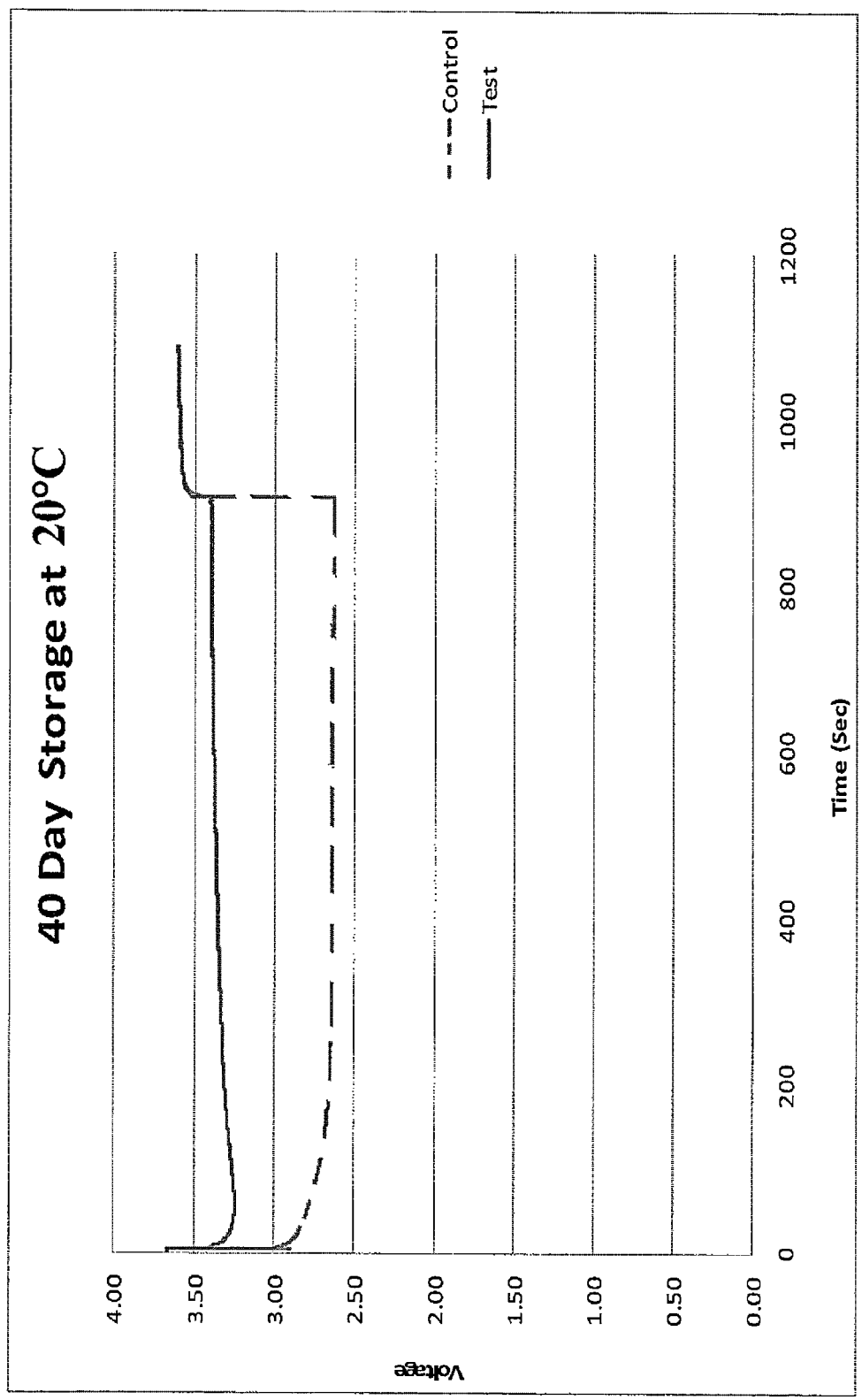
FIG. 7 is a graph of voltage versus time with respect to a control lithium battery and a test lithium battery, each of "DD size", wherein said test lithium battery is made in accordance with the present method, said graph obtained after 40 days storage of said batteries at 20° C.

The battery of the present invention may take the form of (but is not limited to) a modified bobbin-type battery 10 as shown in FIGS. 1*a* & 1*b*; a modified dual-anode type battery 12 as shown in FIGS. 2*a* & 2*b*, or a modified spiral wound ("jelly roll") type battery 14 as shown in FIGS. 3*a* & 3*b*.

In all embodiments of the battery 10, 12, and 14 of the present invention shown in FIGS. 1*a*, 1*b*, FIGS. 2*a*, 2*b*, and FIGS. 3*a*, 3*b* respectively, such battery comprises a metallic alloy anode 20 formed of a first metal that is a strong reducing agent, and at least one further compound adapted to increase a melting point of said first metal in said anode 20. In one embodiment, the first metal in said metallic alloy anode 20 is lithium, which is the lightest known metal and a strong reducing agent, and the alloying compound is magnesium. The lithium-magnesium alloy may be formed by direct-alloying by the melting of mole percent specific mixtures of Li and Mg metal under vacuum, or alternatively via kinetically-controlled vapour formation and deposition (KCVD) of a Li—Mg alloy on a substrate.

The metallic alloy anode 20 has applied to at least one surface thereof a thin, substantially uniform layer 22 of said first metal in substantially pure form. Such pure form may be 99.8% pure lithium, lithium being a metal that is a strong reducing agent, and may be sourced from such suppliers as FMC Corporation or Chemetall Foote Corp., each of North Carolina, U.S.A. The application/bonding of the thin layer 22 to the metallic alloy anode 20 may be accomplished, where the first metal is lithium, by pressure rolling a thin sheet of such first metal onto the thicker metallic alloy anode 20 containing such first metal in alloy form. One such pressure roller device particularly suitable for bonding a thin layer 22 of lithium to a lithium magnesium alloy anode 20 is a Model No. ECR001 Pressure Roller manufactured by Noremac Industrial Automation Ltd.

Application of a thin layer 22 of the first metal to metallic anode 20 by pressure rolling is particularly suited where the metallic anode 20 is initially formed in a substantially flat strip, in the range of 0.050-0.060 inches (ie 1.27-1.52 mm) thick, although due to the ductility of such anode 20 when comprised of at least 75% (wt) of lithium, such anode 20 may later be easily deformed into, for example, cylindrical form (ref. FIG. 1*a*, 1*b*, 2*a*, 2*b*,) or into a spiral form (FIG. 3*a*, 3*b*) for insertion in a cylindrical canister 25 which serves as the lithium battery protective exterior. However, thin layer 22 may alternatively be overlayed with or bonded to metallic alloy anode 20 by other known methods, including plasma coating (deposition) methods or other similar methods of application, which may be more suited if the first metal is of a less ductile nature, and pressure rolling subsequent deformation into cylindrical format is not an option.

If desired, and as described with respect to the "jelly roll" battery 14 as shown in FIG. 3*a*, 3*b*, a pair of thin sheets of such first metal may be bonded to each side metallic anode 20 to form a thin layer 22*a*, 22*b* on each respective side of metallic alloy anode 20, but in the embodiment of FIGS. 1*a*, 1*b*, and FIGS. 2*a*, 2*b*, only one side of such metallic alloy anode 20 has a thin layer 22 bonded thereto Notably, for the purposes of the present invention, in order to give a period of at least 15 minutes of sufficient draw-down current, voltage, and power from the battery 10, 12, or 14 at ambient temperatures (ie less than approximately 50° C.) to thereby allow drilling technicians and well operators to initially test and operate electrical equipment at surface prior to insertion of such equipment and battery downhole, it is contemplated in one embodiment of the invention that the thickness of the thin layer 22 be relatively small in comparison to the thickness of the metallic alloy anode 20, and in a preferred embodiment, since the vast majority of the current being drawn from the battery will be when operating such electrical equipment downhole, that the thickness of the thin layer 22 be in the range of approximately 0.0019 to 0.0025 inches (0.04826-0.0635 mm). As seen from FIG. 15, and as more fully explained herein, such thickness of layer 22, with the battery 12 dimensions of a DD size battery such will provide a short interval of up to 4.2 hours at a drawdown current of 250 mA. By keeping the thickness of the thin layer 22 relatively small, such ensures that even if the battery 10, 12, 14 was to be inserted downhole immediately without such initial testing and thereby without initial discharge at surface where the thin layer 22 would otherwise become consumed in the electrochemical reaction, the amount of first metal in such thin layer 22 (which would immediately become melted due to the higher downhole temperatures) is not of sufficient quantity to cause any significant electrical "short" in such battery 10, 12, 14 when melted, and thus avoids any potential explosion of such battery 10, 12, 14 and consequent loss of electrical power to the downhole electrical equipment.

FIGS. 1a and 1b show a bobbin-type lithium battery 10 of the present invention, comprising a cylindrical canister 25, typically of an electrically conductive metal. A metallic alloy anode 20 formed of 90% lithium and 10% magnesium, or alternatively up to 25% magnesium and 75% lithium has bonded thereto by pressure rolling (in the method described above) a thin [0.002 inch (0.0508 mm) nominal thickness] layer 22 of 99.8% pure lithium. The resulting anode 20 is wound into a cylindrical shape and inserted in canister 25, which may serve as the negative terminal of battery 10. A non-electrically conductive separator 30 comprising a thin sheet of nonwoven fibreglass physically and electrically isolates the anode 20 and negative terminal 50 of battery 10 from a carbon element 32 which serves as the cell cathode and is connected to the cell positive terminal 42. A catholyte 40, preferably thionyl chloride [$SOCl_2$] or alternatively sulfuryl chloride [$SO_2Cl_2$], is inserted in battery 10. Catholyte 40, when in the form of thionyl chloride, has dissolved therein an electrolyte salt in the form of lithium tetrachloroaluminate [$LiAlCl_4$] and/or lithium tetrachlorogallate [$LiGaCl_4$] to increase ion conductivity of the thionyl chloride catholyte and increase current rates, wherein the thionyl chloride catholyte acts as the cathode for the battery 10. An end cap 45 is welded to canister 25, and a glass-metal seal member 44 is used to retain the catholyte 40 within battery canister 25. Battery 10 via its positive terminal 42 and negative terminal 50 is used to provide electrical current to an electrical device, symbolized by resistance "R" in FIG. 1b.

In preferred embodiments of the battery 10, 12, 14 of the present invention, for the relatively strict sizes of batteries utilized in downhole equipment, ranging from AA to DD [ie for cylindrical battery sizes from AA (14.55 mm×50.3 mm ie. 0.57 in×1.98 in.) to DD (47.2 mm dia.×127 mm length ie 1.86 in×5.0 in.)], namely where metallic alloy anode 20 is initially formed from a substantially flat Li—Mg alloy consisting of 75% Li and 25% Mg for which the thin layer 22 of pure lithium is applied thereto, for a bobbin-type battery 10 the metallic alloy anode 20 may be of dimensions 2.0 in in length×0.050 in in thickness (ie 50.8 mm×1.27 mm).

FIGS. 2a & 2b show a battery 12 of the present invention of the "dual anode" type, having a pair of anodes 20a, 20b, which together result in increased surface area to thereby allow such dual-anode battery 12 to provide higher current than the bobbin-type battery 10. In such configuration a first (outer) metallic alloy anode 20a, rolled from a substantially flat substrate into a cylindrical shape, is provided. In one embodiment metallic alloy anode 20a comprises a flat strip of Li—Mg alloy onto which is pressed a thin (0.002 inch nominal thickness) sheet 22a of 99.8% pure Li, and the so-formed anode 20a wound into a cylinder and inserted in cylindrical battery canister 25, with sheet 22 forming the inner periphery of cylindrical anode 20a. A second (inner) anode 20b is similarly formed, likewise comprised of a Li—Mg metallic alloy and similarly having a thin sheet 22b of substantially pure Li applied to an outer surface thereof, and wound in a cylinder and inserted in battery canister 25 in spaced-apart position from outer anode 20a, as shown in FIG. 2b. The thickness of the thin layer 22b on anode 20b may be different than the thickness of thin layer 22a on anode 20a, or may be approximately the same. Intermediate thin layer 22a and 22b is a carbon element 32, which has on either side thereof respective fiberglass insulating layers 30a, 30b.

As seen from FIGS. 2a & b, the alternative-configuration dual-anode battery 12 of the present invention comprises a pair of cylindrical lithium-magnesium alloy anodes 20a, 20b, with (outer)anode 20a being larger in diameter than (inner) anode 20b, with anode 20a concentrically surrounding anode 20b. Outer anode 20a has applied to an inner circular periphery thereof, by any one of the methods above described and preferably by pressure rolling, a thin layer 22a of substantially pure lithium. Similarly, inner anode 20b has applied to an outer circular periphery thereof, via any one of the methods described above, a thin layer 22b of substantially pure lithium. Thin layer 22a may or may not be the same thickness as thin layer 22b, although preferably, for equal electrochemical discharge times when current is drawn from such battery 12, the thickness of layer 22a and 22b is the same. Disposed in a cylindrical space 80 formed intermediate thin layer 22a on outer cylindrical anode 22a and thin layer 22b on inner anode 22b is cylindrical carbon element 32 which serves as the battery positive terminal 42. A pair of non-electrically conductive separators 30a, 30b each comprising a thin sheet of nonwoven fibreglass, physically and electrically isolate the anodes 20a, 20b from each other. Electrically conductive leads 70 connected to anode 20a to 20b may be used to provide negative anode 70 for battery 12. Carbon element 32 is electrically coupled to battery positive terminal 42 as shown in FIGS. 2a,b. An end cap 45 is welded to canister 25, and a glass-metal seal member 44 is used to retain the catholyte 40 within battery canister 25. Catholyte 40 in the form of thionyl chloride having dissolved therein an electrolyte salt in the form of lithium tetrachloroaluminate [$LiAlCl_4$] and/or lithium tetrachlorogallate [$LiGaCl_4$] is injected into battery 12, to act as the cathode for the battery 12. Battery 12 via its positive terminal 42 and negative terminal is used to provide electrical current to an electrical device, symbolized by resistance "R" in FIG. 2b.

Figure 8:
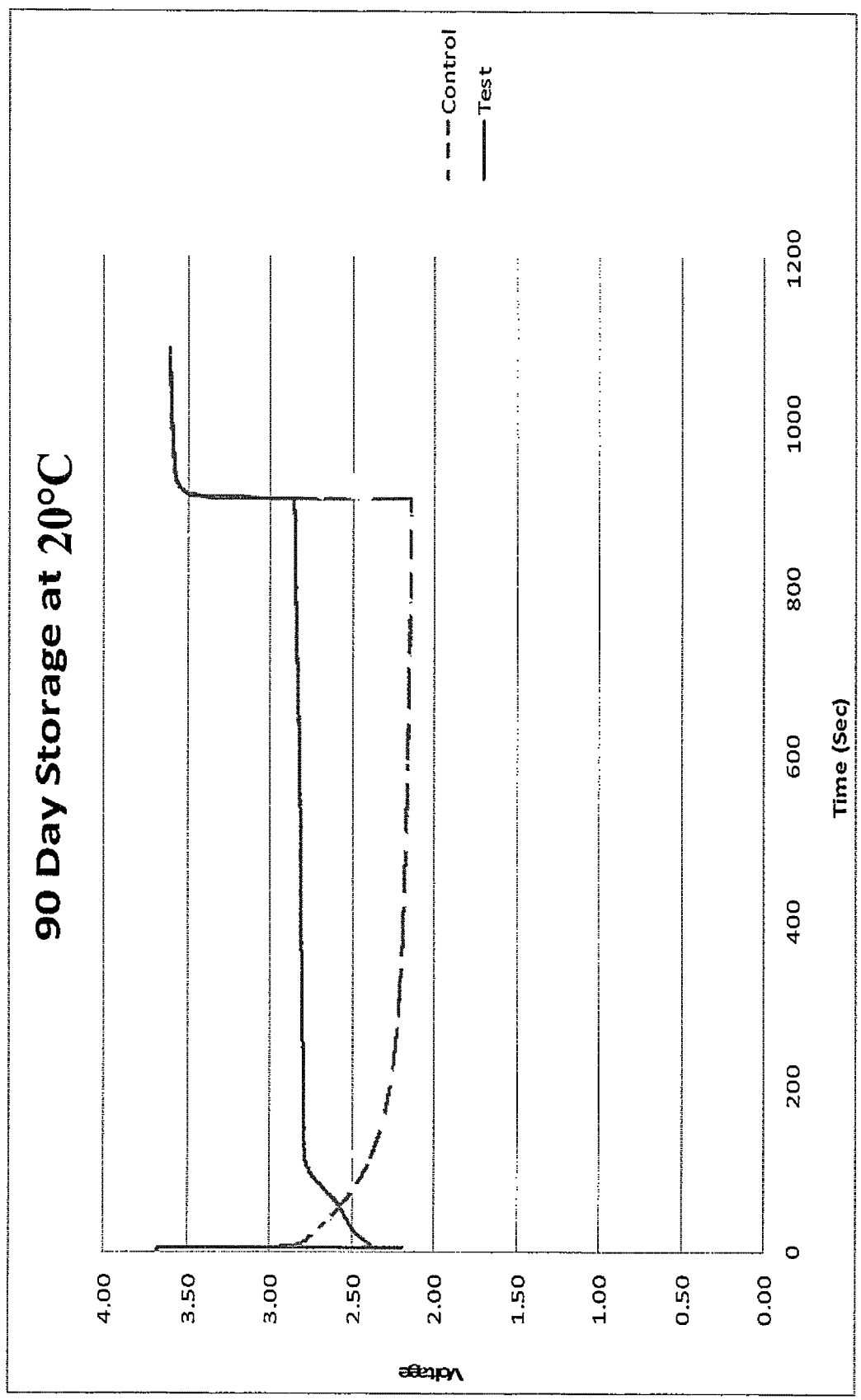
FIG. 8 is a graph of voltage versus time with respect to a control lithium battery and a test lithium battery, each of "DD size", wherein said test lithium battery is made in accordance with the present method, said graph obtained after 90 days storage of said batteries at 20° C.
Figure 9:
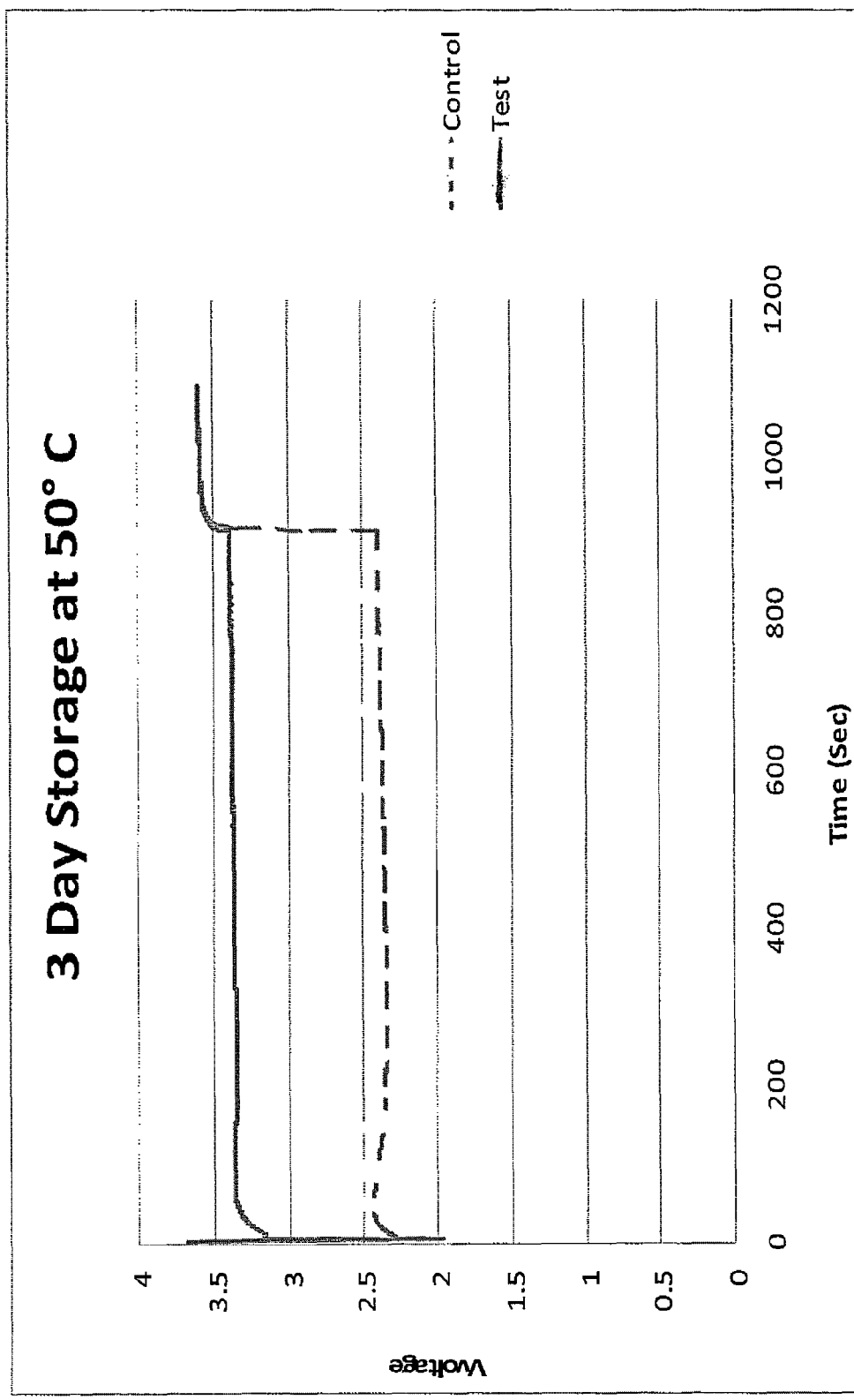
FIG. 9 is a graph of voltage versus time with respect to a control lithium battery and a test lithium battery, each of "DD size", wherein said test lithium battery is made in accordance with the present method, said graph obtained after 3 days storage of said batteries at 50° C.
Figure 10:
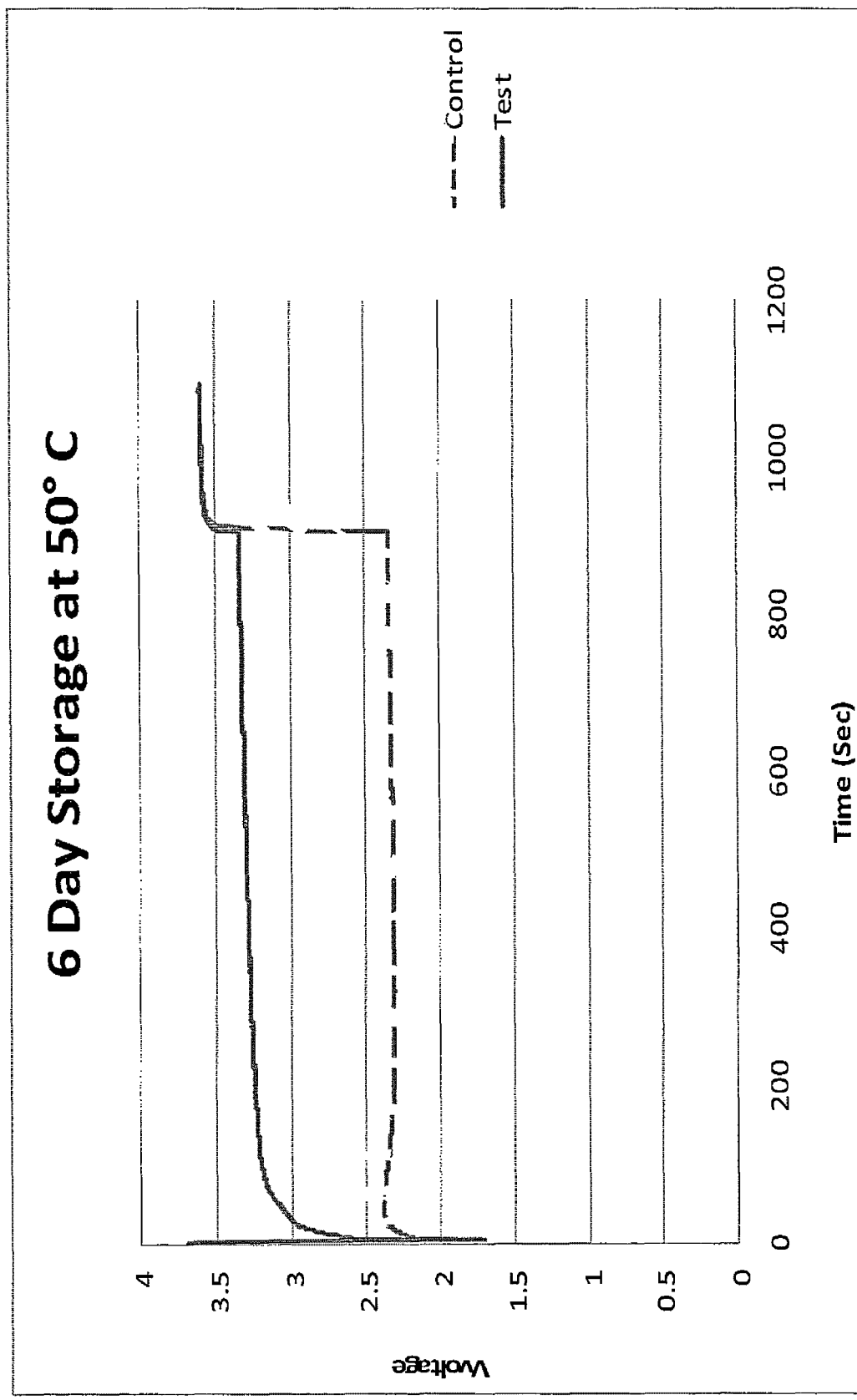
FIG. 10 is a graph of voltage versus time with respect to a control lithium battery and a test lithium battery, each of "DD size", wherein said test lithium battery is made in accordance with the present method, said graph obtained after 6 days storage of said batteries at 50° C.
Figure 11:
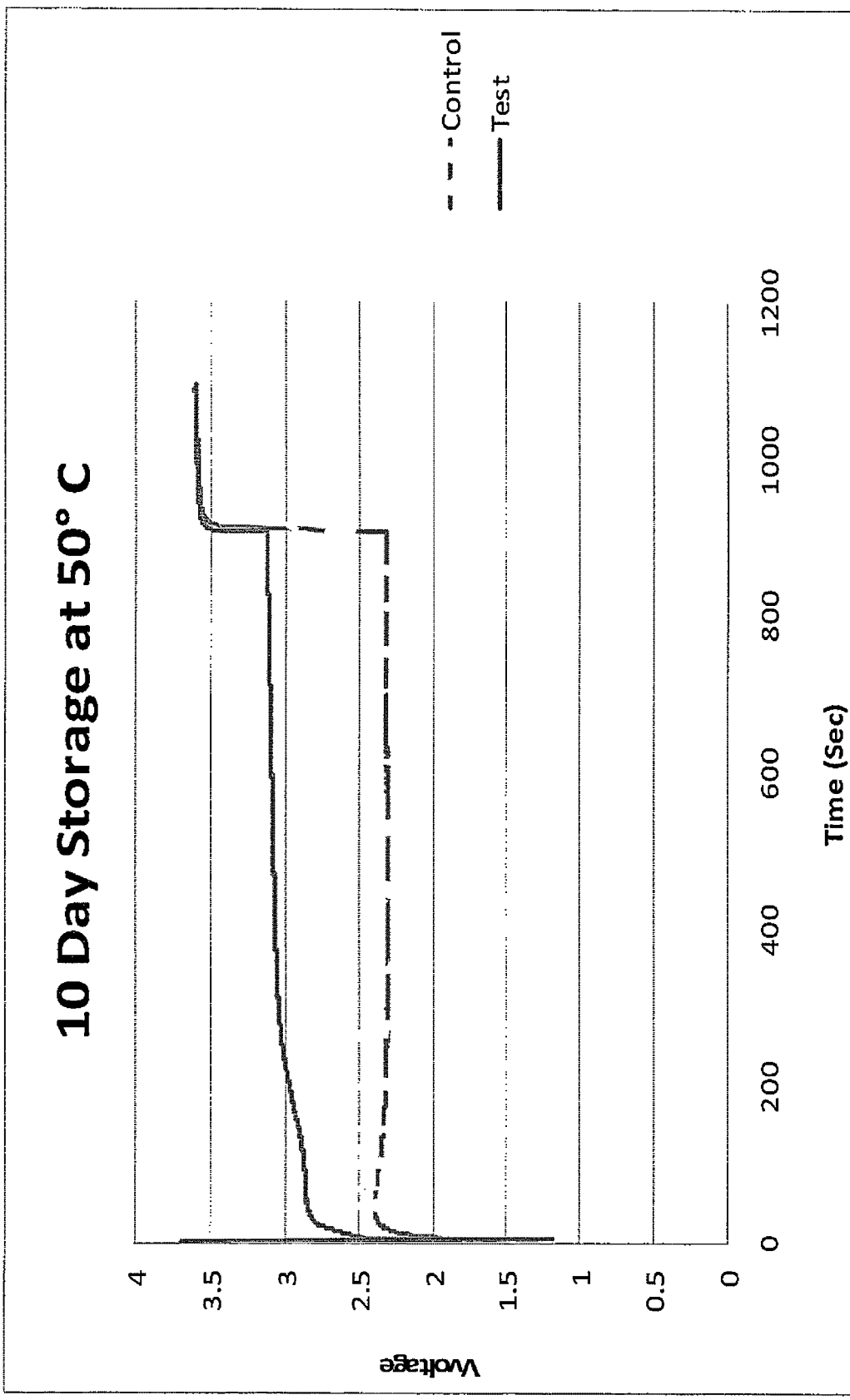
FIG. 11 is a graph of voltage versus time with respect to a control lithium battery and a test lithium battery, each of "DD size", wherein said test lithium battery is made in accordance with the present method, said graph obtained after 10 days storage of said batteries at 50° C.
Figure 12:
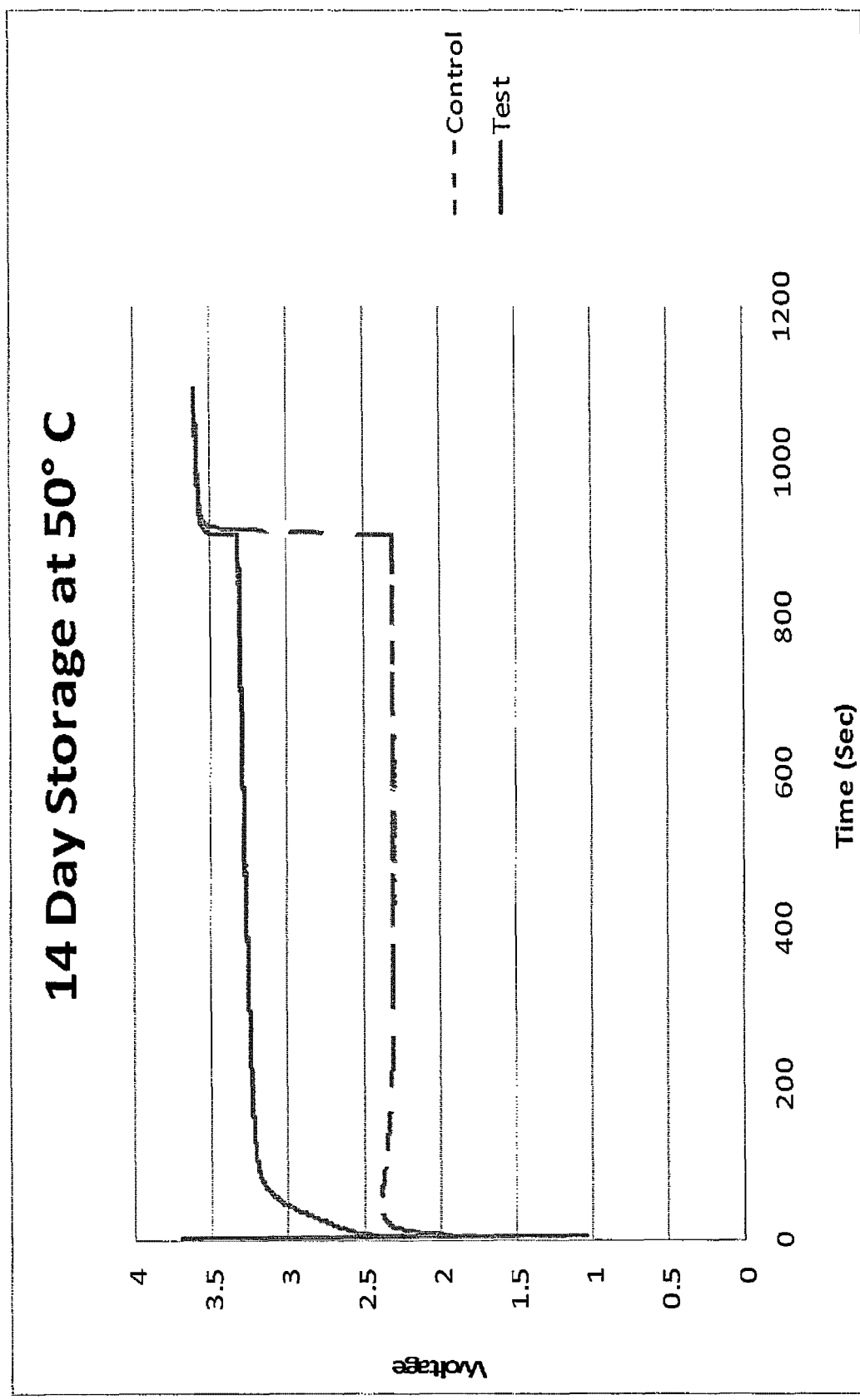
FIG. 12 is a graph of voltage versus time with respect to a control lithium battery and a test lithium battery, each of "DD size", wherein said test lithium battery is made in accordance with the present method, said graph obtained after 14 days storage of said batteries at 50° C.
Figure 13:
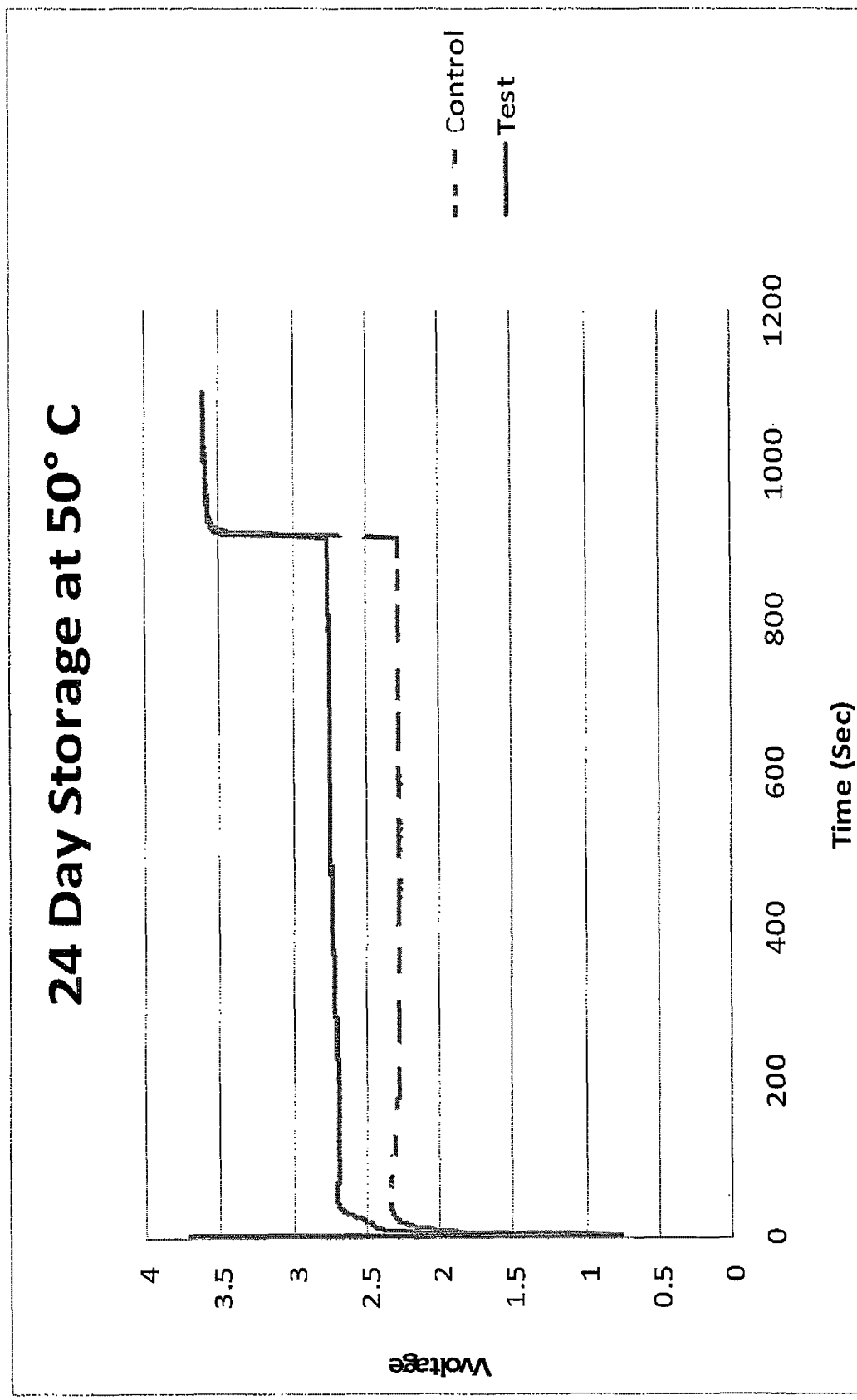
FIG. 13 is a graph of voltage versus time with respect to a control lithium battery and a test lithium battery, each of "DD size", wherein said test lithium battery is made in accordance with the present method, said graph obtained after 24 days storage of said batteries at 50° C.
Figure 14:
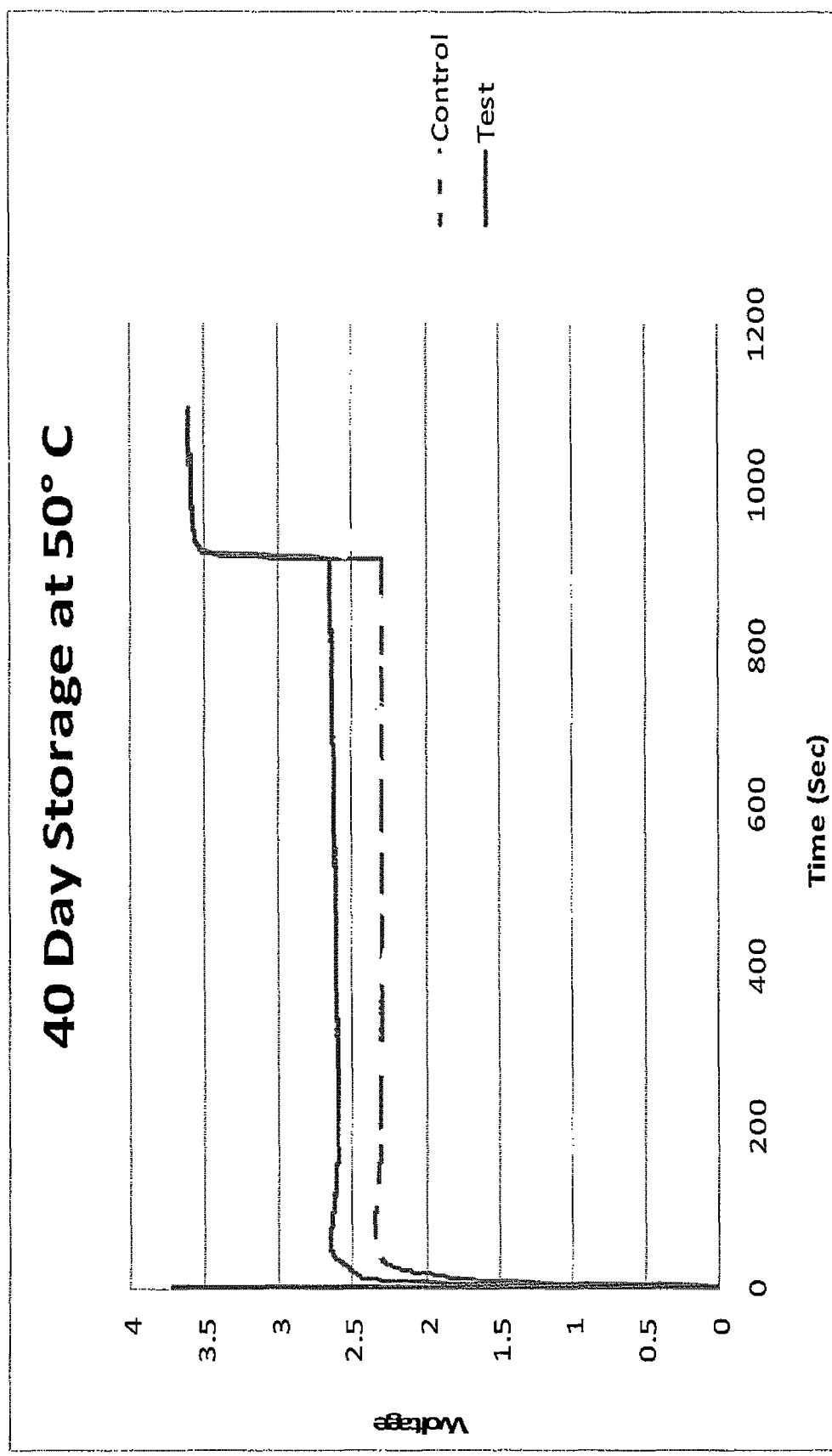
FIG. 14 is a graph of voltage versus time with respect to a control lithium battery and a test lithium battery, each of "DD size", wherein said test lithium battery is made in accordance with the present method, said graph obtained after 40 days storage of said batteries at 50° C.

A "DD" sized battery 12 (approximately 5.0 inches in length, and 1.86 inches in diameter) of the dual-anode configuration, having an outer anode 20a (90% Li, 10% Mg) of approximately 2.0 inches in width and 0.050 in thickness, to which a thin layer 22a of 0.002 inches of pure lithium is applied, and having a inner anode 20b (90% Li, 10% Mg) of approximately 1.85 inches in width and 0.060 inches in thickness to which a thin layer 22b of 0.002 inches of pure lithium is applied, with an initial 90 day storage period, can provide, with a drawdown current of 250 ma and at a temperature of at 20° C., a voltage between 2.5 to 2.8 volts for a period of at least 900 seconds (ie 15 minutes) (see FIG. 8).

Figure 15:
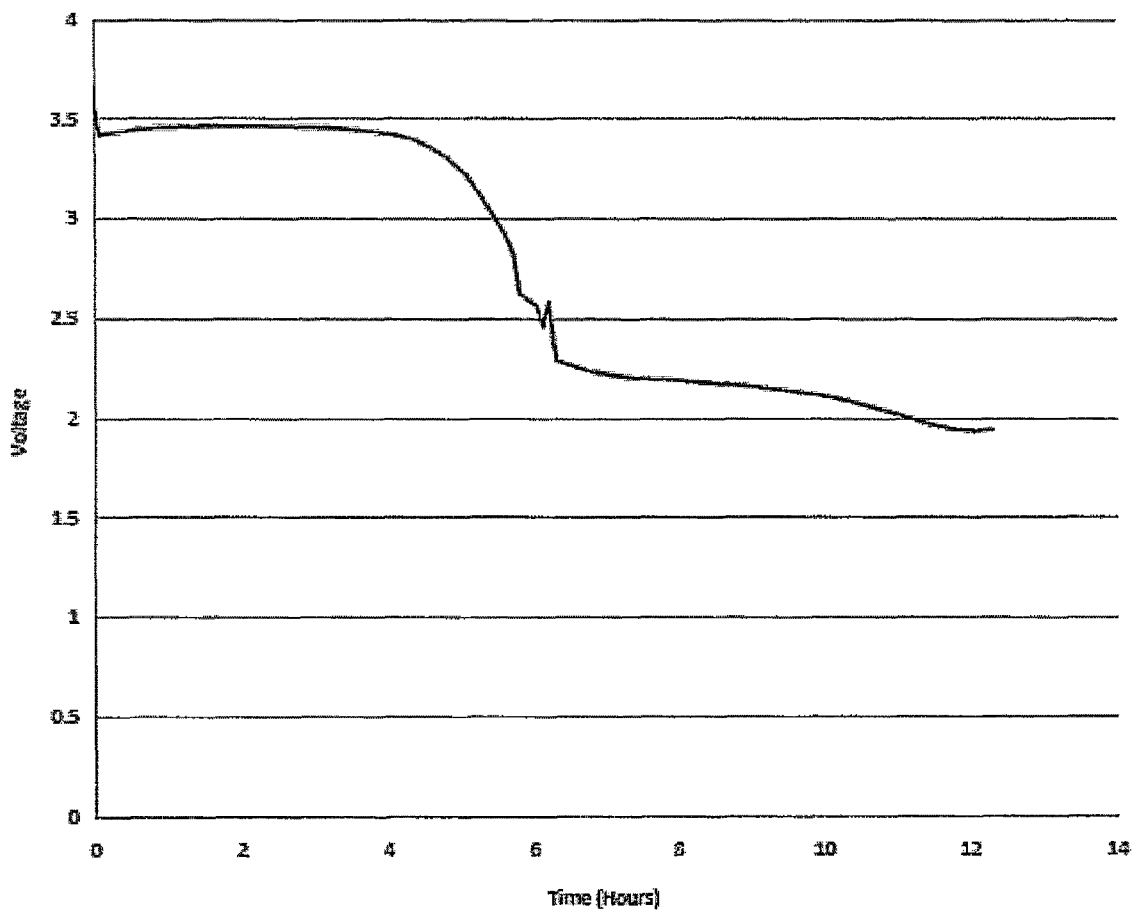
FIG. 15 is a graph of voltage versus time, at room temperature of 24° C., with respect to a dual-anode size DD lithium battery of the present invention, showing the relatively high voltage of approximately 3.5 volts which is thus obtainable for a 4.2 hour period, with a 0.002 nominal thickness 100% pure lithium layer overlying a lithium-magnesium alloy anode.

Alternatively, with no initial storage period, a similar battery at a temperature of 24° C. and with a similar drawdown current of 250 mA, can provide for a period of 4.2 hours a voltage approaching the battery maximum, namely 3.5 volts (see FIG. 15).

FIGS. 3a-3b show a battery 14 of the present invention of the "spiral" or "jelly-roll" configuration, which as a result of the increased surface area of the anode 20a arising from spiral winding of the anode 20a within canister 25, can provide higher current than either the bobbin-type battery 10 or "dual anode" battery 12.

For the spiral battery 14 of FIG. 2a, 2b, a substantially flat strip of Li—Mg metallic alloy anode 20a is provided, onto a portion of the (outer)) side surface of anode 20a is pressed a thin (0.002 inch nominal thickness) sheet 22a of 99.8% pure Li over a portion (ie an inner side surface and an outer side surface) of anode 20a. Pressed onto an opposite (inner) side is a similar thin layer 22b of substantially pure Li metal. An electrically insulating thin sheet 30a which in one embodiment is a fibreglass weave material is further applied to such inner side, and over which is applied a carbon sheet 32 substantially comprised of carbon black, which forms the positive electrode for battery 14. Over carbon sheet 32 is applied a similar electrically insulating thin sheet 30b to thus, in combination with insulating sheet 30a, electrically insulate carbon sheet 32 on which positive charges are formed, from each of anodes 20a, 20b on which negative electrical charge is formed. The resulting sheet [of mutually-overlying 'sandwiched' layers 20a, 22a, 30a, 32, and 30b ] is wound in a spiral configuration, with portions of such resulting sheet overlapping as shown in FIG. 3a, and inserted within battery casing 25.

A cathode 40, and more particularly a catholyte in the form of thionyl chloride having dissolved therein an electrolyte salt in the form of lithium aluminum chloride [$LiAlCl_4$] and/or lithium gallium chloride [$LiGaCl_4$] is injected into battery 14, to act as the cathode for the battery 14. Alternatively sulfuryl chloride may be used as the catholyte. A liquid-retaining seal 56 is provided immediately above upwardly facing ends of layers 22a, 20a, 22b, 30a, 32, and 30b as shown in FIG. 3b, and an electrically insulating material 56 applied to a top surface of seal 56. A metallic end cap 60 is welded to a top end of canister 25, and a glass-metal seal member 44 is used to retain the catholyte 40 within battery canister 25. Positive electrode 42, electrically coupled to carbon element 32, and negative electrode 70 electrically coupled to anodes 20a, 20b, protrude from a top end of battery 14.

As evidence of the utility and practicality of the high temperature battery of the present invention in attaining at least one of its objects, namely providing a high temperature battery adapted to operate in relatively high temperatures yet allowing substantial current and voltages for an initial limited time period at lower temperatures, as series of tests were carried out.

EXAMPLE 1

A "dual-anode" DD sized battery 12 of the present invention was constructed in the manner described above, having a metallic alloy anode consisting of 90% Li and 10% Mg.

In each case anodes 20a, 20b having a thin layer 22a, 22b of substantially pure (99.8%) Li of nominal 0.002 inch thickness. The dimensions of anode 20a were 2.0 inches×0.050 inches, and of anode 20b were 1.85 inches×0.060 inches.

Using an intial start-up load current of 250 mA, voltage output of a plurality of dual-anode type battery 12 were measured over a 15 minute initial period (900 seconds), at 20° C. with various pre-storage times for each of the respective batteries tested, namely 0 days, 3 days, 15 days, 40 days, and 90 days. Voltage output continued to be monitored after removal of the 250 mA load, for a further 300 seconds, for a total voltage monitoring time of 1200 seconds.

Graphs of measured voltage output versus time, for each of the five DD batteries tested, for each of the pre-storage times of 0, 3, 15, 40, and 90 days, are set out respectively in FIGS. 4-8, as compared to voltage output over a similar time period from a "control" battery not having any thin layer of pure Li.

As may be seen from FIGS. 4-7, voltage output of the "test" battery in accordance with the above invention in all instances exceeded the voltage output of the "control" battery, regardless of the initial storage period.

With respect to test having pre-storage of 90 days (ref. FIG. 8), save for the initial start-up period of approximately 100 seconds (during which time effects of battery passivation may have been playing a role), thereafter and up to 15 minutes thereafter the voltage output of the "test" cell significantly exceeded that of the control high temperature battery, for the duration of the test (15 minutes) where load was applied.

EXAMPLE 2

A similar comparison test was carried out as in Example 1 above, again at 20° C. save that the pre-storage for each of the respective batteries tested, namely 3 days, 6 days, 10 days, 14 days, 24 days, and 40 days, occurred at temperatures of 50° C., instead of at 20° C. as in Example 1.

Graphs of measured voltage output versus time, for each of the five DD batteries tested, for each of the pre-storage times of 3, 6, 10, 14, 24, and 40 days respectively, are set out respectively in FIGS. 9-14, as compared to voltage output versus time from a "control" battery not having any thin layer of pure Li.

As may be seen from FIGS. 9-14, voltage output of the "test" battery in accordance with the above invention in all instances exceeded the voltage output of the "control" battery, regardless of the initial storage period, for an initial period of at least 15 minutes whereafter the 250 mA load was removed.

EXAMPLE 3

To determine the approximate time period for which a Li—Mg anode having a substantially pure coating applied thereto in accordance with the method of the present invention could operate at room temperature before the electrochemical reaction (during discharge of the battery) used up such thin layer of pure lithium, a lithium-magnesium battery of the type prepared in Examples 1 and 2 was prepared.

More specifically, a DD size battery, having a lithium-magnesium alloy anode comprising 90% Li and 10% Mg, and having a nominal 0.002 inch strip/layer of substantially 99.8% pure Li) lithium applied thereto, was prepared. Such prepared battery had a pre-storage period at 24° C. of less than 3 days.

At room temperature (24° C.), and with a current load of approximately 250 mA being drawn from such cell, voltage from such battery was measured over a time period of approximately 13 hours.

FIG. 15 shows a graph of the voltage measured from such cell, as a function of time.

As may be seen from FIG. 15, by the application of a substantially pure, thin, layer of lithium metal to a substrate comprising a 90%-10% lithium-magnesium alloy anode, a maximum battery voltage of approximately 3.45 volts was capable of being obtained and maintained for a short interval of time, namely for a period of approximately 4.2 hours, at a room temperature range (namely 24° C.).

The scope of the claims should not be limited by the preferred embodiments set forth in the foregoing examples, but should be given the broadest interpretation consistent with the description as a whole, and the claims are not to be limited to the preferred or exemplified embodiments of the invention.

The invention claimed is:
1. A battery comprising:
  (i) an anode including at least two electrochemically active layers comprising a first electrochemically active layer and a second electrochemically active layer, each reactive with a cathode or catholite of said battery;
  (ii) said first electrochemically active layer including at least 75 wt. % lithium and at least one further substance alloyed which is different than lithium therewith, said at least one further substance having a melting point higher than 180.5° C. and wherein said first electrochemically active layer has a melting point in excess of 180.5° C.; and (iii) said second electrochemically active layer having a chemical composition difference from said first electrochemically active layer, said second electrochemically active layer being a layer of lithium in substantially pure form, said second electrochemically active layer being applied to a surface of said first electrochemically active layer; and whereby said first electrochemically active layer is not a substrate for said second electrochemically active layer and whereby upon electrochemical dissipation of said second electrochemically active layer, said first electrochemically active layer itself electrochemically reacts with said cathode or catholite of said battery.

2. The battery as claimed in claim 1 wherein said at least one further substance comprises magnesium, and said first electrochemically active layer comprises a lithium-magnesium alloy comprised of at least 10 wt. % magnesium and a remainder substantially comprised of lithium.

3. The battery as claimed in claim 2, wherein said first electrochemically active layer is a lithium-magnesium alloy comprising approximately 25 wt. % magnesium.

4. The battery as claimed in claim 3, wherein said second electrochemically active layer is of a thickness in the range of 0.0019 to 0.0025 inch.

5. The battery as claimed in claim 1, wherein
said first electrochemically active layer includes a pair of mutually opposite sides, and
said second electrochemically active layer is uniformly applied to one side of said pair of mutually opposite sides of said anode.

6. The battery as claimed in claim 2, further comprising a catholite comprised of liquid thionyl chloride.

7. The battery as claimed in claim 1, wherein said at least one further substance is a reducing agent.

8. A non-coin lithium battery comprising:
(i) an anode including at least two electrochemically active layers comprising a first electrochemically active layer and second electrochemically active layer, each reactive with a cathode or catholite of said battery;
(ii) said first electrochemically active layer including at least 75 wt% lithium and at least one further substance alloyed therewith, said at least one further substance being a reducing agent and having a melting point higher than 180.5° C., and wherein said first electrochemically active layer has a melting point in excess of 180.5° C.; and
(iii) said second electrochemically active layer having a chemical composition different from said first electrochemically active layer, said second electrochemically active layer being a layer of lithium in substantially pure form, said second electrochemically active layer being applied to a surface of said first electrochemically active layer; and
whereby said first electrochemically active layer is not a substrate for said second electrochemically active layer and whereby upon electrochemical dissipation of said second electrochemically active layer, said first electrochemically active layer itself electrochemically reacts with said cathode or catholite of said battery.

9. The lithium battery as claimed in claim 8, wherein said first electrochemically active layer contains approximately 25 wt. % magnesium.

10. A lithium battery as claimed in claim 9, wherein said second electrochemically active layer is of a thickness in the range of 0.0019 to 0.0025 inch.

11. The lithium battery as claimed in any one of claim 8, 9 or 10 further comprising a cathode comprised of liquid thionyl chloride.

12. A non-rechargeable battery, comprising:
(i) an anode comprising a first electrochemically active layer and a second electrochemically active layer, each of said first and second electrochemically active layers successively electrochemically reactive with a cathode or catholite of said battery;
(ii) said first electrochemically active layer comprising at least 75 wt. % lithium and at least one further substance which is different than lithium alloyed therewith having a melting point higher than 180.5° C. and wherein said first electrochemically active layer has a melting point in excess of 180.5° C.; and
(iii) said second electrochemically active layer having a chemical composition different from said first electrochemically active layer, said second electrochemically active layer being a substantially uniform layer of lithium in substantially pure form, said second electrochemically active layer being applied to a surface of said first electrochemically active layer;
whereby said first electrochemically active layer is not a substrate for said second electrochemically active layer and whereby upon electrochemical dissipation of said second electrochemically active layer, said first electrochemically active layer itself electrochemically reacts with said cathode or catholite of said battery.

* * * * *